US00RE46415E

(19) United States
(12) Reissued Patent
Lee et al.

(10) Patent Number: US RE46,415 E
(45) Date of Reissued Patent: May 23, 2017

(54) LOW-COST NETWORK SYSTEM BETWEEN A BASE STATION CONTROLLER AND A BASE TRANSCEIVER STATION, AND METHOD FOR TRANSMITTING DATA BETWEEN THEM

(71) Applicant: KT Corporation, Seongnam-si, Gyeonggi-do (KR)

(72) Inventors: Kyeong-Soo Lee, Gyeonggi-do (KR); Hee-Nam Son, Seoul (KR); Hak-Seong Yu, Seoul (KR); Sang-Hoon Park, Gyeonggi-do (KR)

(73) Assignee: KT Corporation, Seongnam-si, Gyeonggi-do (KR)

(21) Appl. No.: 14/486,511

(22) Filed: Sep. 15, 2014

Related U.S. Patent Documents

Reissue of:
(64) Patent No.: 7,565,167
Issued: Jul. 21, 2009
Appl. No.: 10/962,076
Filed: Oct. 7, 2004

U.S. Applications:
(63) Continuation of application No. PCT/KR03/00690, filed on Apr. 8, 2003.

(30) Foreign Application Priority Data

Apr. 8, 2002 (KR) ..... 10-2002-0019031

(51) Int. Cl.
*H04W 80/04* (2009.01)
*H04W 92/12* (2009.01)

(52) U.S. Cl.
CPC ..... *H04W 80/04* (2013.01); *H04W 92/12* (2013.01)

(58) Field of Classification Search
CPC ..... H04W 80/04; H04W 92/12
See application file for complete search history.

(56) References Cited

U.S. PATENT DOCUMENTS 5,708,657 A 1/1998 Hong et al.
5,901,358 A * 5/1999 Petty et al. ..... 455/456.2
(Continued)

FOREIGN PATENT DOCUMENTS

JP 07058806 3/1995
JP 09191485 7/1997
(Continued)

*Primary Examiner* — Mary Steelman
(74) *Attorney, Agent, or Firm* — Brundidge & Stanger, P.C.

(57) ABSTRACT

Various embodiments of the invention relate to a low-cost network system that can reduce the network cost by connecting a base station controller (BSC) with a base transceiver station (BTS) by the use of matching units that match an E1/T1 line to an IP line. In one embodiment, the system comprises a BSC matching unit (BSCMU) and a BTS matching unit (BTSMU). The BSCMU, connected to the BSC through a first dedicated line, converts a first dedicated-line data signal, received from the BSC, into a first IP signal to be transmitted through an IP line and converts a received second IP signal into a second dedicated-line data signal to be transmitted to the BSC. The BTSMU, connected to the BTS through a second dedicated line, converts the first IP signal into the first dedicated-line data signal to be transmitted to the BTS and converts the second dedicated-line data signal, received from the BTS, into the second IP signal.

19 Claims, 6 Drawing Sheets

(56) References Cited

U.S. PATENT DOCUMENTS

| | | | | |
|---|---|---|---|---|
| 6,072,790 | A | 6/2000 | Neumiller et al. | |
| 6,292,891 | B1 | 9/2001 | Bergenwall et al. | |
| 6,353,742 | B1 | 3/2002 | Bach | |
| 6,359,880 | B1 * | 3/2002 | Curry et al. | 370/352 |
| 6,363,253 | B1 * | 3/2002 | Valentine et al. | 455/445 |
| 6,600,734 | B1 * | 7/2003 | Gernert et al. | 370/352 |
| 6,853,627 | B1 * | 2/2005 | Evans | 370/312 |
| 2001/0046214 | A1 | 11/2001 | Kang et al. | |
| 2001/0055300 | A1 | 12/2001 | Chen et al. | |
| 2003/0027567 | A1 * | 2/2003 | Rest et al. | 455/427 |
| 2003/0142648 | A1 * | 7/2003 | Semper | 370/331 |
| 2004/0062251 | A1 | 4/2004 | Johansson et al. | |

FOREIGN PATENT DOCUMENTS

| | | |
|---|---|---|
| JP | 10174185 | 6/1998 |
| JP | 11331206 | 11/1999 |
| JP | 2000004262 | 1/2000 |
| JP | 2001189732 | 7/2001 |
| KR | 19990053845 | 7/1999 |
| KR | 20000075168 | 12/2000 |
| KR | 20010082243 | 8/2001 |
| KR | 2002037786 | 5/2002 |
| WO | 0147198 | 6/2001 |
| WO | 01060106 | 8/2001 |

* cited by examiner

AMENDED FIG. 5

LOW-COST NETWORK SYSTEM BETWEEN A BASE STATION CONTROLLER AND A BASE TRANSCEIVER STATION, AND METHOD FOR TRANSMITTING DATA BETWEEN THEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation application, and claims the benefit under 35 U.S.C. §§120 and 365 of PCT Application No. PCT/KR03/00690, filed on Apr. 8, 2003 and published Oct. 23, 2003, in English, which is hereby incorporated by reference.

BACKGROUND OF INVENTION

1. Field of the Invention

The present invention relates to a low-cost network system that can reduce the network cost by connecting a base station controller (BSC) with a base transceiver station (BTS) by the use of matching units that match a dedicated line such as an E1/T1 line to an IP line such as a digital subscriber line (DSL).

2. Description of the Related Technology

Along with the development of various technologies, the telecommunication networks have evolved from a wired network such as PSTN that provides communication service at a fixed location to a mobile communication network that literally provides communication service on the move. Generally, the mobile communication system is focused on moving objects such as people, vehicles, ship, trains, and airplanes.

SUMMARY OF CERTAIN INVENTIVE ASPECTS OF THE INVENTION

One aspect of the invention provides a low-cost network system that can reduce network expenses by constructing the communication network between a base station controller (BSC) and a base transceiver station (BTS) with an E1/T1 dedicated line and a low-cost IP line.

Another aspect of the invention provides a method for transmitting data that can improve the efficiency of data transmission at less expense by installing matching units that can match an E1/T1 dedicated line with an IP line and convert an E/T1 signal and an IP packet mutually. Namely, in this aspect of the invention, the IP line that is matched to the E1/T1 dedicated line is a general-purpose (or universal) line that is low cost such as a telephone line, so the network expenses can be reduced. Also, it is preferable to use a data buffer to convert E1/T1 signal into IP packet according to the direction of data transmission.

Another aspect of the invention provides a network system for connecting BSC and BTS in a mobile communication system, the network system comprising: a BTS for communicating with a mobile terminal selected from plural mobile terminals; a BSC for controlling wireless communication between the BTS and the mobile terminal; a BSC matching unit (BSCMU) being connected to the BSC through a first dedicated line for converting a dedicated-line data signal transmitted by the BSC into an IP signal to be transmitted through an IP line and converting the IP signal transmitted through the IP line into the dedicated-line data signal to be transmitted to the BSC; and a BTS matching unit (BTSMU) being connected to the BTS through a second dedicated line for converting the IP signal transmitted by the BSCMU into the dedicated-line data signal to be transmitted to the BTS and converting the dedicated-line data signal transmitted by the BTS into the IP signal to be transmitted the BSCMU. The dedicated line is one selected from E1 line and T1 line, and the IP line is one selected from ADSL, SDSL, and VDSL.

In one embodiment, the BSCMU comprises: a transceiver for communicating the dedicated-line data signal with the BSC; a converter for converting the dedicated-line data signal transmitted by the BSC into the IP signal and the IP signal transmitted by the BTSMU into the dedicated-line data signal; an IP interface for communicating the IP signal with the BTSMU; and a controller for controlling the transceiver, the converter, and the IP interface. The BSCMU further comprises a buffer for storing the dedicated-line data signal to be transmitted to the BSC. And, the BSCMU further comprises a buffer state monitor for producing buffer state data relative to a current state and a maximum storing capacity of the buffer to be transmitted to the BTSMU. And, the BSCMU further comprises an IP address controller for maintaining an IP address of the IP line connecting the BSCMU with the BTSMU. And, the BSCMU further comprises a present state monitor for monitoring an operational state of the BSCMU to check for failure. And the BSCMU further comprises a transmission controller for controlling a size of the IP signal to be transmitted to the BTSMU according to the buffer state data of BTSMU.

In one embodiment, the BTSMU comprises: a transceiver for communicating the dedicated-line data signal with the BTS; a converter for converting the dedicated-line data signal transmitted by the BTS into the IP signal and the IP signal transmitted by the BSCMU into the dedicated-line data signal; an IP interface for communicating the IP signal with the BSCMU; and a controller for controlling the transceiver, the converter, and the IP interface. The BTSMU further comprises a buffer for storing the IP signal transmitted by the BSCMU. The BTSMU further comprises a buffer state monitor for producing buffer state data relative to a current state and a maximum storing capacity of the buffer to be transmitted to the BSCMU. The BTSMU further comprises an IP address controller for maintaining an IP address of the IP line connecting the BTSCMU with the BSCMU. The BTSMU further comprises a present state monitor for monitoring an operational state of the BTSMU to check for failure. The BTSMU further comprises a transmission controller for controlling a size of the IP signal to be transmitted to the BSCMU according to the buffer state data of the BSCMU.

Another aspect of the invention provides a BSCMU in a mobile communication system comprising a BTS for communicating with a mobile terminal selected from plural mobile terminals, a BTSMU being connected to the BTS through a dedicated line for converting an IP signal into a dedicated-line data signal to be transmitted to the BTS and converting the dedicated-line data signal transmitted by the BTS into the IP signal, and a BSC for controlling wireless communication between the BTS and the mobile terminal, the BSCMU comprising: a transceiver for communicating the dedicated-line data signal with the BSC; a converter for converting the dedicated-line data signal transmitted by the BSC into the IP signal and the IP signal transmitted by the BTSMU into the dedicated-line data signal; an IP interface for communicating the IP signal with the BTSMU; and a controller for controlling the transceiver, the converter, and the IP interface.

Still another aspect of the invention provides a BTSMU in a mobile communication system comprising a BTS for communicating with a mobile terminal selected from plural mobile terminals, a BSC for controlling the BTS and a BSCMU being connected to the BSC through a dedicated line for converting a dedicated-line data signal transmitted through the dedicated line into an IP signal and the IP signal into a dedicated-line data signal to be transmitted to the BSC, the BTSMU comprising: a transceiver for communicating the dedicated-line data signal with the BTS; a converter for converting the dedicated-line data signal transmitted by the BTS into the IP signal and the IP signal transmitted by the BSCMU into the dedicated-line data signal; an IP interface for communicating the IP signal with the BSCMU; and a controller for controlling the transceiver, the converter, and the IP interface.

Still another aspect of the invention provides a data transmission method in a BSCMU of a mobile communication network, wherein the mobile network comprises a BTS for communicating with a mobile terminal selected from plural mobile terminals, a BTSMU being connected to the BTS through a dedicated line for converting an IP signal into a dedicated-line data signal to be transmitted to the BTS and converting the dedicated-line data signal transmitted by the BTS into the IP signal, and a BSC for controlling the BTS, the method comprising the steps of: receiving the dedicated-line data signal from the BSC via the dedicated line; converting the dedicated-line data signal into the IP signal; receiving buffer state data relative to a current state and a maximum storing capacity of a buffer in the BTSMU; controlling a size of the IP signal to be transmitted to the BTSMU according to the buffer state data; and transmitting the IP signal to the BTSMU through an IP line, wherein the IP signal is converted into the dedicated-line data signal at the BTSMU and transmitted to the mobile terminal by the BTS.

Yet another aspect of the invention provides a data transmission method in a BTSMU of a mobile communication network, wherein the mobile network comprises a BTS for communicating with a mobile terminal selected from plural mobile terminals, a BSCMU being connected to the BSC through a dedicated line for converting an IP signal into a dedicated-line data signal to be transmitted to the BTS and the dedicated-line data signal transmitted by the BTS into the IP signal and a BSC for controlling the BTS, the method comprising the steps of: receiving the dedicated-line data signal from the BTS via the dedicated line; converting the dedicated-line data signal into the IP signal; receiving buffer state data relative to a current state and a maximum storing capacity of a buffer in the BSCMU; controlling a size of the IP signal to be transmitted to the BSCMU according to the buffer state data; and transmitting the IP signal to the BSCMU through an IP line, wherein the IP signal is converted into the dedicated-line data signal at the BSCMU and transmitted to BSC.

DETAILED DESCRIPTION OF CERTAIN EMBODIMENTS OF THE INVENTION

Figure 1:
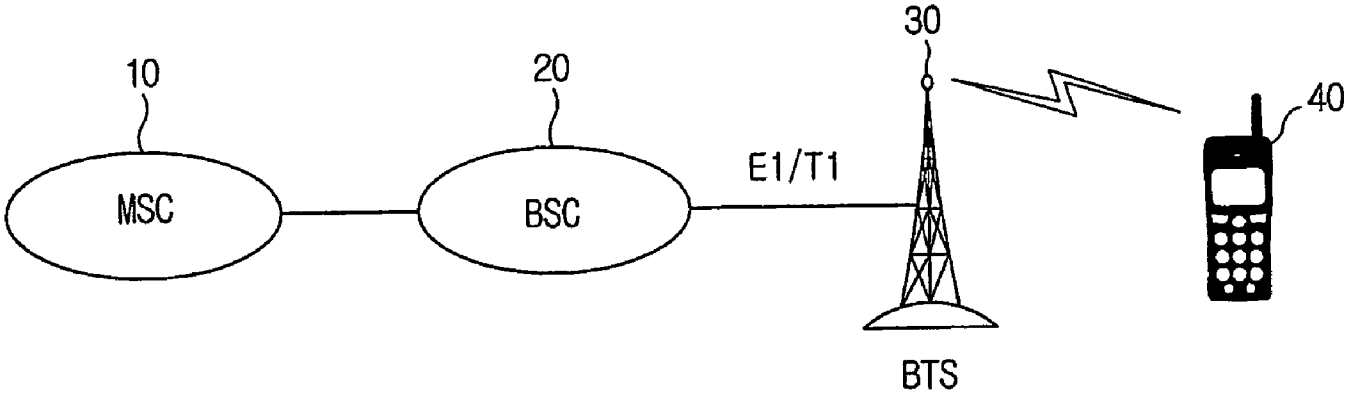
FIG. 1 is a block diagram of a typical mobile communication system.

FIG. 1 is a block diagram of a typical mobile communication system. Referring to FIG. 1, a subscriber can communicate with another subscriber via a MS (mobile station) 40 in the mobile communication system. The BTS (Base Transceiver Station) 30 receives a call process request signal from MS 40, and transmits a call transmission request signal from BSC (Base Station Controller) 20 to MS 40. BSC 20 controls BTS 30 for signal transmission between BTS 30 and MSC (Mobile Switching Center) 10. MCS 10 transmits the call process request signal to another communication network to provide the mobile communication service to the subscriber. The other network may be PSTN (Public Switching Telephone Networks) or AMPS (Advanced Mobile Phone Service).

When a subscriber wants to use the mobile communication service via MS 10, the MSC 10 finds the location of the receiver's MS according to the control signal from BSC 20 and provides mobile communication services such as transmission of a voice/fax signal or access to another communication network according to the request from MS 40.

Typically, BSC 20 and BTS 30 are connected to each other by E1 or T1 dedicated line, so BSC 20 and BTS 30 are equipped with E1/T1 access devices. E1 indicates European Transmission Service 1, and comprises thirty B-channels for user data transmission and one D-channel for signal data transmission. T1 is one of the standard services of US T1 committee, and comprises twenty-three B-channels and one D-channel. The B-channel carries data at the speed of 64 Kbps and the D-channel carries data at the speed of 16 Kbps, so E1 format has 2.048 Mbps bandwidth and T1 format has 1.544 Mbps bandwidth. In the data transmission between BSC 20 and BTS 30 through E1/T1 line, the fixed rate non-channelized HDLC (High-level Data Link Control) method, which transmits data without distinction of channel and at fixed rate, is used.

In SAMSUNG ("Reference to the Samsung Corporation") 1×EV-DO (1× Evolution Data-Only) system, for example, one data packet transmitted through E1 dedicated line is composed of 135 bytes, and divided into three ATM (Asynchronous Transfer Mode) cells by SAR (Segmentation And Reassembly) for transmission. The 53 bytes of ATM cell are composed of 5 bytes of ATM cell header, 3 bytes of SAR header, and 45 bytes of payload.

As described above, though E1/T1 line is used to transmit data between BSC 20 and BTS 30 at high speed, the cost to use E1/T1 is very high compared with the data transmission capacity of E1/T1. Actually, data transmission at the maximum bandwidth (2.048 Mbps/1.544 Mbps) rarely occurs because most data transmission is performed below the maximum bandwidth. Thus, when using E1/T1 line for data transmission between BSC 20 and BTS 30, the mobile communication service provider is assessed enormous network expenses.

As alternative solutions to the above-mentioned problem, several methods have been developed: a) improve the efficiency of data transmission by changing the length of frame according to the rate of data transmission, and b) lay an optical transmission line between BSC and BTS for data transmission. Even if the length of frame varies according to the data transmission rate, the problem about high expenses in comparison with the efficiency of data transmission has still not been resolved. Also, regarding the optical transmission line, an enormous initial investment is required to lay and use the optical transmission line, so it is also difficult to reduce the network expenses.

Figure 2:
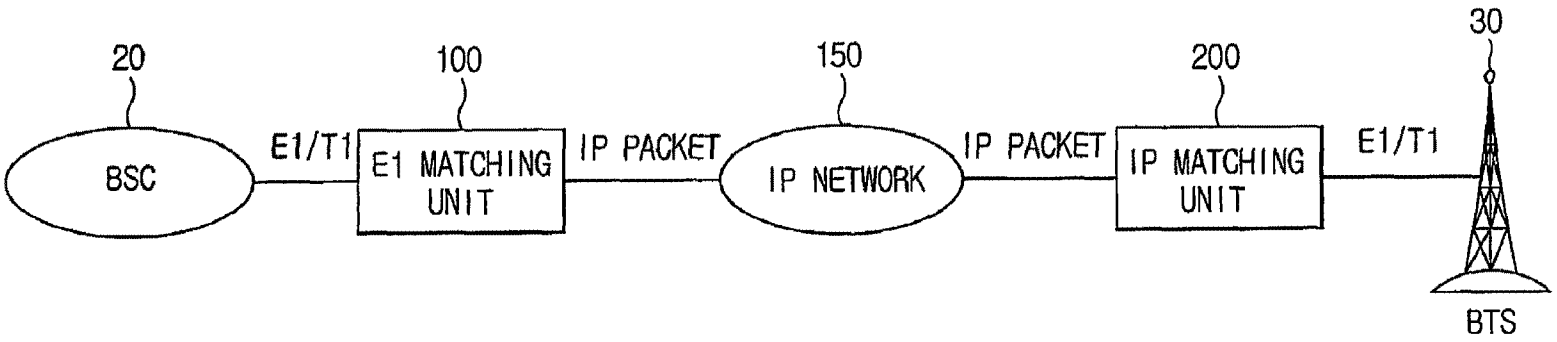
FIG. 2 is a block diagram of the low-cost network system according to one embodiment of the invention.

FIG. 2 is a block diagram of the low-cost network system according to one embodiment of the invention. Referring to FIG. 2, the low-cost network system is provided with an E1 matching unit 100 for converting E1/T1 signal into IP packet in BSC 20 and an IP matching unit 200 for converting IP packet into E1/T1 signal in BTS 30 in order to transmit IP packets through IP network 150. That is, regarding data transmission from BSC 20 to BTS 30, the E1 matching unit 100 in BSC [30] *20* converts E1/T1 signal into the IP packet and transmits the IP packet to BTS 30 through the IP network 150. The IP matching unit 200 in BTS 30 converts the IP packet transmitted through IP network 150 into E1/T1 signal and transmits E1/T1 signal to BTS 30. The bandwidths of each E1 and T1 dedicated line correspond to 2.048 Mbps and 1.544 Mbps, respectively. Thus, when converting E1/T1 signal into IP packet, the bandwidth of the IP network must be more than 2 Mbps. IP protocol, which is used on the Internet, has a TCP/IP class structure, and is included within a network layer of OSI 7 layers of which some part is dependent upon the network and the other part is independent from the network.

Figure 3:
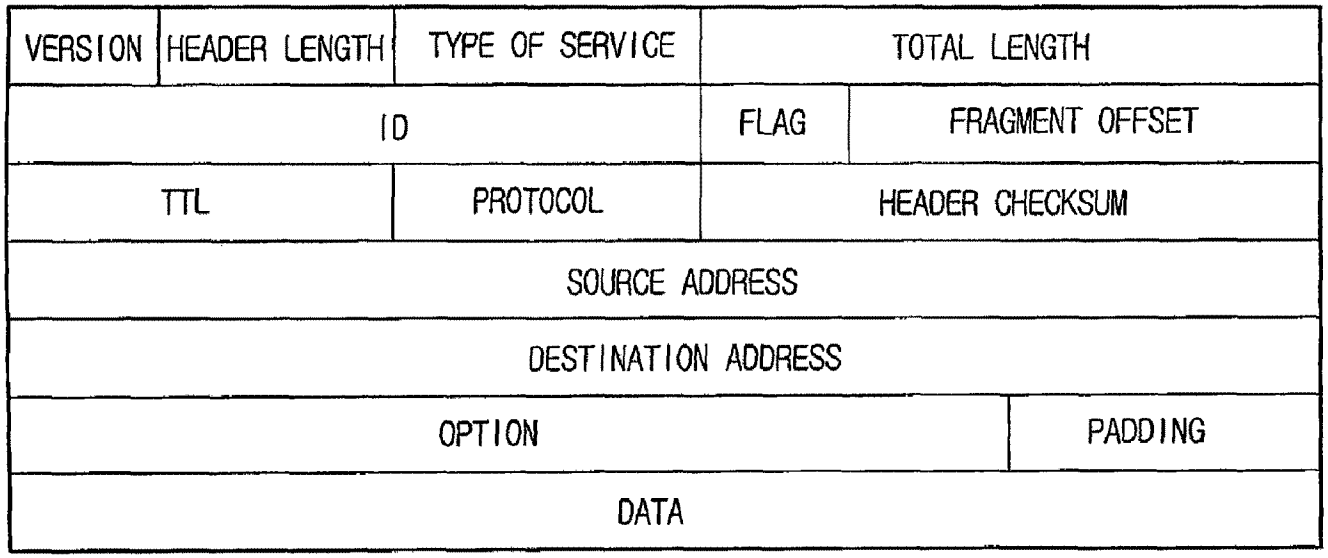
FIG. 3 shows the structure of an IP packet according to one embodiment of the invention.

FIG. 3 shows the structure of an IP packet according to one embodiment of the invention. Referring to FIG. 3, in IP packet, VERSION indicates the version of IP protocol and HEADER LENGTH indicates the length of header. TOS (Type Of Service or Service Type) indicates priority, delay, process rate and security, all required for IP packet. TOTAL LENGTH indicates the total length of IP packet comprising a header and a data, and the value of TOTAL LENGTH can be 65,536 bytes. Since one message can be divided into several IP packets on IP network, ID is used to assemble the divided packets into the message. FRAGMENT OFFSET indicates how distant the IP packet is from the start of the message when plural IP packets are included within the one message. TTL (Time-To-Live) indicates the maximum time regarding how long IP packet exists on IP network. PROTOCOL indicates a high-layer protocol that the IP packet is included, and HEADER CHECKSUM indicates checking errors in a header. SOURCE ADDRESS and DESTINATION ADDRESS indicate the IP addresses of the source and the destination respectively. OPTION indicates security, routing and the type of data, and PADDING can be used to compose a 32-bit header as the occasion demands.

In various embodiments, the transmission line between BSC 20 and BTS 30 satisfy the bandwidth of E1/T1 while maintenance expenses of IP network 150 composed of IP lines are cheaper than that of E1/T1 line. One example of the IP line that satisfies these requirements is a DSL (Digital Subscriber Line) that improves the transmission speed of digital data by expanding the analog bandwidth of a telephone line. To the present time, various methods regarding effective transmission distances and applications have been developed: ADSL (Asymmetric DSL), SDSL (Symmetric DSL), VDSL (Very high-bit-rate DSL), etc. The IP network can be Ethernet that supports multicast. Ethernet uses CSMA/CD (Carrier Sense Multiple Access with Collision Detection) protocol, and can be classified into 10Base-X having 10 Mbps bandwidth, 100Base-X (Fast Ethernet) having 100 Mbps bandwidth, and 1000Base-X having 1 Gbps bandwidth.

Generally, regarding the leasing of E1/T1 dedicated line from ISP, about 800,000 Korean WON (Approximately US$650) is required, but when leasing a general-purpose (or universal) line such as ADSL, about 30,000 to 100,000 WON is required. Thus, if ADSL that can carry an IP packet is leased and a matching unit that can convert the IP packet into an E1/T1 signal or the E1/T1 signal into IP packet are provided to BSC and BTS, the total expenses can be reduced to about 1/10 the typical cost. In particular, the network expenses may increase in proportion to the number of subscribers with regard to the mobile communication service providers that have millions of subscribers, but the network expenses may decrease when the communication network is constructed by connecting the E1/T1 dedicated line with a general-purpose line such as DSL.

In addition, the IP packet has variable data size and a burst characteristic, so managing the transmission speed may be necessary for optimum transmission by the use of a buffer in the IP matching unit during the process of converting the IP packet transmitted through IP network into E1 signal having a fixed size.

Figure 4:
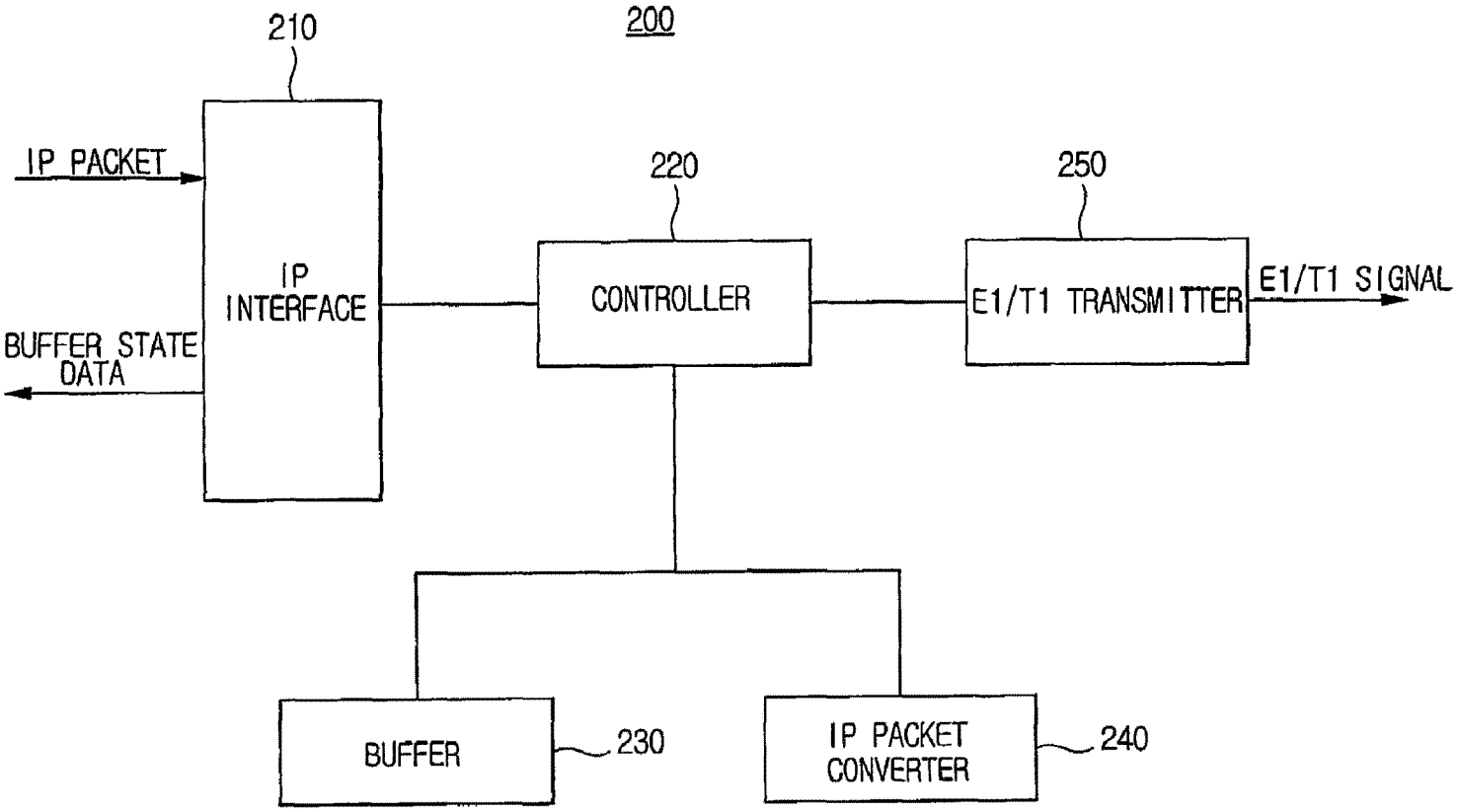
FIG. 4 is block diagram of IP matching unit for converting IP packet into E1/T1 signal according to embodiments of the invention.

FIG. 4 is a block diagram of IP matching unit for converting IP packet into E1/T1 signal according to embodiments of the invention. Referring to FIG. 4, an IP matching unit 200 is installed at BTS and receives IP packets, which are transmitted through IP network, by an IP interface 210. Namely, the IP interface 210 receives an IP packet that an E1 matching unit at the BSC has transmitted through IP network. The IP packet received by IP interface 210 is temporarily stored at a buffer 230 through a controller 220. The order of arrival may not coincide with the order of transmission if the message is composed of plural IP packets. In this situation, a buffering process is used to reconstruct the message by aligning the received IP packets. Also, the transmission speed of IP packets is controlled for alignment of the received IP packets. Furthermore, it is preferable that the IP matching unit 200 sends buffer state data indicating the size and state of buffer to the E1/T1 matching unit. Thus, the E1/T1 matching unit can control the transmission speed of IP packets according to the buffer state data transmitted by the IP matching unit 200.

The IP packets at the buffer 230 are converted into E1/T1 signals by an IP packet converter 240. The converted E1/T1 signals are transmitted to BTS through an E1/T1 transmitter 250.

In addition, because the E1/T1 signals transmitted from BSC 20 to BTS 30 are ATM cells having a fixed size, the E1 matching unit 100 does not need additional buffer for converting E1/T1 signals into IP packets. However, regarding data transmission from BTS 30 to BSC 20, a buffer may be used to change the transmission speed of E1/T1 signals as the occasion demands.

Figure 5:
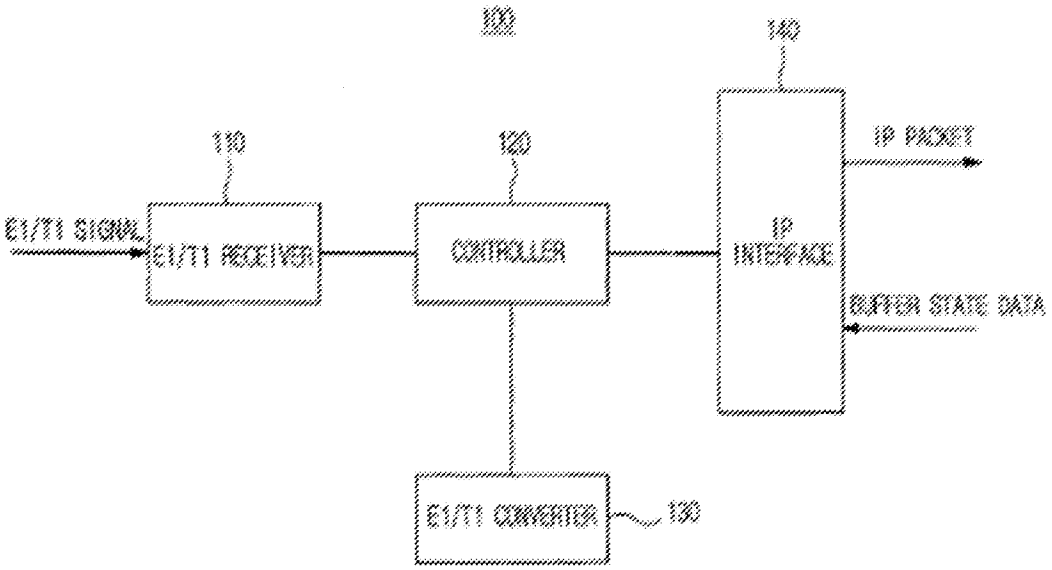
FIG. 5 is a block diagram of E1 matching unit for converting E1/T1 signal into IP packet according to embodiments of the invention.

FIG. 5 is a block diagram of E1 matching unit for converting E1/T1 signal into IP packet according to embodiments of the invention. Referring to FIG. 5, the E1 matching unit 100 receives E1/T1 signal, which is transmitted by BSC, via E1/T1 receiver 110. The E1/T1 converter 130 converts E1/T1 signals received by the E1/T1 receiver 110 into IP packets according to the instruction of the controller

120. The IP interface 140 transmits the converted IP packets to the IP matching unit 200 through IP network. In one embodiment, the transmission speed of IP packets is controlled according to the size and state of the buffer in the IP matching unit 200. As such, an E1 matching unit can control the transmission speed according to the buffer state data transmitted by the IP matching unit 200. Accordingly, the E1 matching unit 100 can further comprise a buffer for temporarily storing E1/T1 signals before IP packet conversion occurs.

To this point, an example of E1/T1 signal transmission from BSC 20 to BTS 30 has been described, and for this downward transmission. In one embodiment, an E1 matching device for converting an E1/T1 signal into IP packet is installed at the BSC, and an IP matching device for converting IP packet into E1/T1 signal is installed at BTS. In one embodiment, regarding E1/T1 signal transmission from BTS 30 to BSC 20, the BTS 30 converts E1/T1 signal into IP packet while the BSC 20 converts IP packet into E1/T1 signal. In this embodiment, the E1 matching unit for converting E1/T1 signal into IP packet is installed at the BTS 30, and the IP matching unit for converting IP packet into E1/T1 signal is installed at the BSC 20. It is preferable that the matching unit installed at the BSC 20 and the BTS 30 comprises a bi-directional converting function, which converts the E1/T1 signal into the IP packet and the IP packet into the E1/T1 signal, and a buffer.

On the contrary if the E1 matching unit 100 at BSC 20 uses a public IP, the IP matching unit 200 at BTS 30 uses a private IP or Dynamic IP. Thus, the IP address of the IP line is not changed after the connection between BSC 20 and BTS 30 is set up. For maintaining the established IP line, a dummy packet can be periodically transmitted through the IP line or a virtual IP method can be used. Also, the matching unit can further comprise a present state monitor for periodically monitoring when failure occurs and also alerting the BSC 20 when the failure has occurred.

Figure 6:
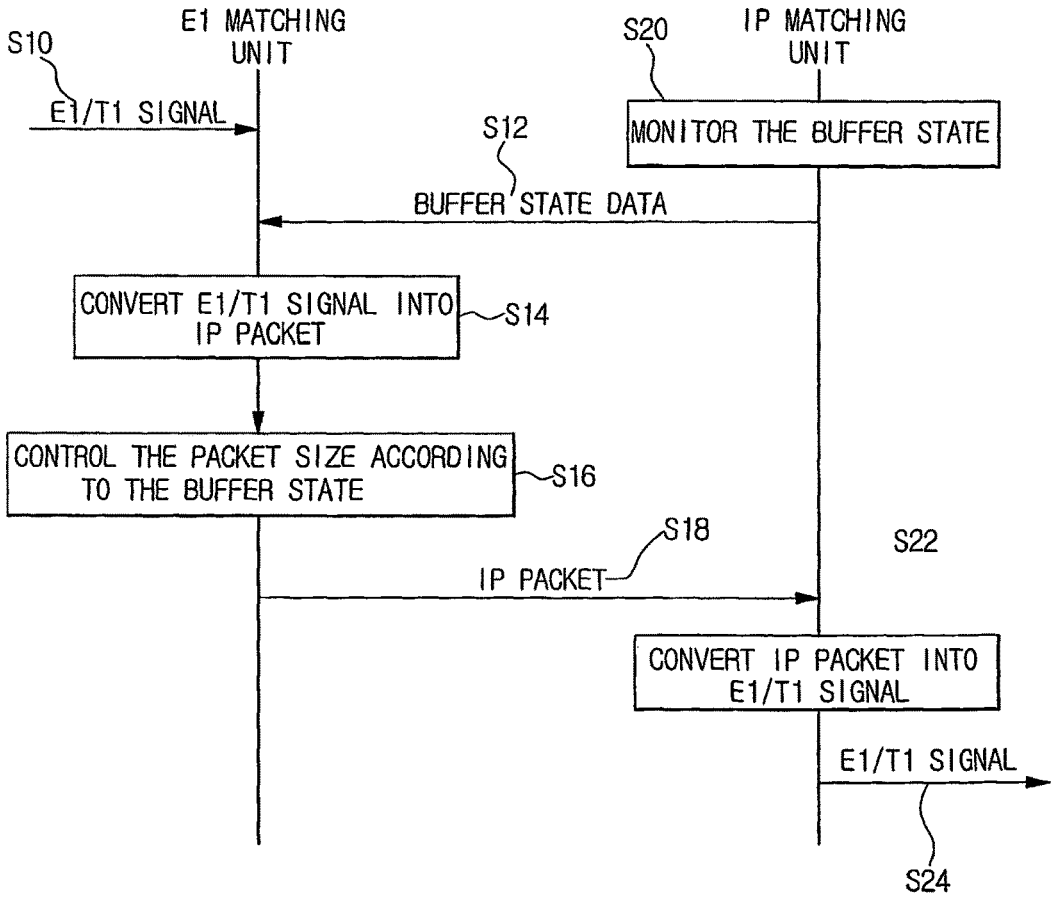
FIG. 6 is a flowchart of the method for transmitting data using the low-cost network system according to one embodiment of the invention.

FIG. 6 is a flowchart of the method for transmitting data using the low-cost network system according to one embodiment of the invention. Referring to FIG. 6, the method for transmitting data is performed at an E1 matching unit, which is installed at the BTS, for converting an E1/T1 signal into an IP packet plus at an IP matching unit, which is installed at the BSC, for converting an IP packet into an E1/T1 signal. The E1 matching unit receives the E1/T1 signal transmitted by BSC (S10), and converts the E1/T1 signal into IP packet (S14). At this time, the IP matching unit that will receive the IP packet monitors the buffer state (S20), and transmits the buffer state data indicating the maximum size and the current state of buffer to E1 matching unit (S12). The E1 matching unit checks the buffer state of IP matching unit according to the buffer state data, and controls the size of IP packet in order to prevent the occurrence of buffer overflow (S16). After converting E1/T1 signal into IP packet, the E1 matching unit transmits the IP packet to the IP matching unit through IP network (S18). The IP matching unit receives the IP packet transmitted by E1 matching unit, converts the IP packet into E1/T1 signal (S22), and transmits the E1/T1 signal to BTS (S24).

Regarding E1/T1 signal transmission from BTS to BSC, the matching unit at BTS will work as an E1 matching unit whereas the matching unit at BSC will work as IP matching unit.

As described above, according to various embodiments of the invention, the network expenses for using dedicated lines can be reduced by changing the E1/T1 dedicated line connected between BSC and BTS with the IP line Furthermore, embodiments of the invention comprise matching units that can match E1/T1 dedicated line and IP line, convert E1/T1 signals and IP packets mutually, and transmit the converted E1/T1 signal or IP packet. Therefore, efficiency of data transmission can be improved at small expense.

While the above description has pointed out novel features of the invention as applied to various embodiments, the skilled person will understand that various omissions, substitutions, and changes in the form and details of the device of the device or process illustrated may be made without departing from the scope of the invention. Therefore, the scope of the invention is defined by the appended claims rather than by the foregoing description. All variations coming within the meaning and rage of equivalency of the claims are embraced within their scope.

What is claimed is:

1. A system for signal processing in a mobile communication system, [the system] comprising:

a base transceiver station (BTS) [for communicating] *configured to communicate* a *call* signal with a mobile terminal selected from [plural] *a plurality of* mobile terminals;

a base station controller (BSC) [for controlling] *configured to control* wireless communication between the BTS and the mobile terminal;

a BSC matching unit (BSCMU), being connected to the BSC through a first dedicated line, configured to convert a first dedicated-line data signal transmitted by the BSC into a first set of IP packets and convert a second set of IP packets into a second dedicated-line data signal to be transmitted to the BSC; and a BTS matching unit (BTSMU), being connected to the BTS through a second dedicated line, configured to convert the first set of IP packets into the first dedicated-line data signal to be transmitted to the BTS and convert the second dedicated-line data signal transmitted by the BTS into the second set of IP packets to be transmitted to the BSCMU, wherein the BTSMU is further configured to communicate the IP packets with the BSCMU via an IP network.

2. The system of claim 1, wherein each dedicated line is an E1 or T1 line.

3. The system of claim 1, wherein the IP packets are transmitted via one of the following protocols: ADSL(Asymmetric DSL), SDSL(Symmetric DSL), and VDSL(Very high-bit-rate DSL).

4. The system of claim 1, wherein the BSCMU comprises:

a transceiver [for communicating] *configured to communicate* the first and second dedicated-line data signals with the BSC via the first dedicated line;

a converter [for converting] *configured to convert* the first dedicated-line data signal transmitted by the BSC into the first set of IP packets and [converting] *convert* the second set of IP packets transmitted by the BTSMU into the second dedicated-line data signal;

an IP interface [for communicating] *configured to communicate* the first and second set of IP packets with the BTSMU; and a controller [for controlling] *configured to control* the transceiver, the converter, and the IP interface.

[5. The system of claim 4, further comprising a buffer for storing the second dedicated-line data signal received from the BSC.]

[6. The system of claim 4, further comprising a buffer state monitor for producing buffer state data relative to a current state and a maximum storing capacity of the buffer to be transmitted to the BTSMU.]

[7. The system of claim 6, further comprising a transmission controller for controlling the size of the first set of IP packets to be transmitted to the BTSMU according to the buffer state data of the BTSMU.]

8. The system of claim 4, [further comprising] *wherein the BSCMU further comprises* an IP address controller [for maintaining] *configured to maintain* an IP address of the IP network.

9. The system of claim 4, [further comprising] *wherein the BSCMU further comprises* a present state monitor [for monitoring] *configured to monitor* an operational state of the [BSCMU] *BSC* to check for failure.

10. The system of claim 1, wherein the BTSMU comprises:

a transceiver [for communicating] *configured to communicate* the first and second dedicated-line data signals with the BTS via the second dedicated line;

a converter [for converting] *configured to convert* the second dedicated-line data signal transmitted by the BTS into the second set of IP packets and [converting] *convert* the first set of IP packets transmitted by the BSCMU into the first dedicated-line data signal;

an IP interface [for communicating] *configured to communicate* the first and second set of IP packets with the BSCMU; and a controller [for controlling] *configured to control* the transceiver, the converter, and the IP interface.

11. The system of claim 10, [further comprising] *wherein the BTSMU further comprises* a buffer [for storing] *configured to store* the first set of IP packets received from the BSCMU.

[12. The system of claim 10, further comprising a buffer state monitor for producing buffer state data relative to a current state and a maximum storing capacity of the buffer to be transmitted to the BSCMU.]

[13. The system of claim 12, further comprising a transmission controller for controlling the size of the second set of IP packets to be transmitted to the BSCMU according to the buffer state data of the BSCMU.]

14. The system of claim 10, [further comprising] *wherein the BTSMU further comprises* an IP address controller [for maintaining] *configured to maintain* an IP address of the IP network.

15. The system of claim 10, [further comprising] *wherein the BTSMU further comprises* a present state monitor [for monitoring] *configured to monitor* an operational state of the BTSMU to check for failure.

16. A system for signal processing in a mobile communication system, [the system] comprising:

a base transceiver station (BTS) configured to communicate a signal with a mobile terminal; and a BTS matching unit (BTSMU), being connected to the BTS via a first dedicated line, configured to input one of an Internet protocol (IP) signal and a dedicated-line data signal and output the other signal, wherein the BTSMU is further configured to i) communicate the dedicated-line data signal with the BTS via the first dedicated line and ii) communicate the IP signal with a base station controller [(BSC)] matching unit (BSCMU) via an IP network, and wherein the BSCMU is connected to [the BSC] *a base station controller* (*BSC*) via a second dedicated line.

17. A system for signal processing in a mobile communication system, [the system] comprising:

a base station controller (BSC) configured to control wireless communication between a base transceiver station (BTS) and a mobile terminal, wherein the BTS is configured to communicate a signal with the mobile terminal; and a BSC matching unit (BSCMU), being connected to the BSC via a first dedicated line, configured to input one of an Internet protocol (IP) signal and a dedicated-line data signal and output the other signal, wherein the BSCMU is further configured to i) communicate the dedicated-line data signal with the BSC via the first dedicated line and ii) communicate the IP signal with a base transceiver station [(BTS)] matching unit (BTSMU) via an IP network, and wherein the [BTSMIJ] *BTSMU* is connected to the BTS via a second dedicated line.

18. A method of signal processing in a mobile communication system, [the method] comprising:

communicating, at a base transceiver station (BTS), a signal with a mobile terminal;

providing a BTS matching unit (BTSMU) which is connected to the BTS via a first dedicated line; and at the BTSMU, receiving one of an Internet protocol (IP) signal and a dedicated-line data signal and outputting the other signal, wherein the BTSMU [communicates] *is configured to i) communicate* the dedicated-line data signal with the BTS via the first dedicated line and [communicates] *ii) communicate* the IP signal with a base station controller [(BSC)] matching unit (BSCMU) via an IP network, and wherein the BSCMU is connected to [the BSC] *a base station controller* (*BSC*) via a second dedicated line.

19. A method of signal processing in a mobile communication system, [the method] comprising:

controlling, at a base station controller (BSC), wireless communication between a base transceiver station (BTS) and a mobile terminal, wherein the BTS [communicates] *is configured to communicate* a signal with the mobile terminal;

providing a BSC matching unit (BSCMU) which is connected to the BSC via a first dedicated line; and at the BSCMU, receiving one of an Internet protocol (IP) signal and a dedicated-line data signal and outputting the other signal, wherein the BSCMU [communicates] *is configured to i) communicate* the dedicated-line data signal with the BSC via the first dedicated line and [communicates] *ii) communicate* the IP signal with a base transceiver station [(BTS)] matching unit (BTSMU) via an IP network, and wherein the BTSMU is connected to the BTS via a second dedicated line.

*20. The system of claim 4, wherein the BSCMU further comprises a buffer configured to store the second set of IP packets received from the BTSMU.*

*21. The system of claim 4, wherein the BSCMU further comprises a buffer state monitor configured to produce buffer state data relative to a current state and a maximum storing capacity of the buffer to be transmitted to the BSCMU.*

*22. The system of claim 21, wherein the BSCMU further comprises a transmission controller configured to control the size of the first set of IP packets to be transmitted to the BTSMU according to the buffer state data of the BTSMU.*

*23. The system of claim 10, wherein the BTSMU further comprises a buffer state monitor configured to produce buffer state data relative to a current state and a maximum storing capacity of the buffer to be transmitted to the BTSMU.*

*24. The system of claim 23, wherein the BTSMU further comprises a transmission controller configured to control the size of the second set of IP packets to be transmitted to the BSCMU according to the buffer state data of the BSCMU.*

* * * * *